(12) United States Patent
Arai et al.

(10) Patent No.: US 8,907,634 B2
(45) Date of Patent: Dec. 9, 2014

(54) CHARGER FOR PORTABLE ELECTRONIC DEVICE

(75) Inventors: Nobuhiro Arai, Ashikaga (JP); Seiji Takai, Hirakata (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 537 days.

(21) Appl. No.: 13/416,890

(22) Filed: Mar. 9, 2012

(65) Prior Publication Data
US 2012/0229090 A1 Sep. 13, 2012

(30) Foreign Application Priority Data

Mar. 10, 2011 (JP) ................................. 2011-052909

(51) Int. Cl.
*H02J 7/00* (2006.01)
*H02J 7/04* (2006.01)

(52) U.S. Cl.
CPC ........................................ *H02J 7/04* (2013.01)
USPC ............................ 320/163; 320/111; 320/158

(58) Field of Classification Search
USPC ........................... 320/111, 162–164, 157, 158
See application file for complete search history.

(56) References Cited

U.S. PATENT DOCUMENTS

| 7,884,571 | B2 * | 2/2011 | Veselic | 320/107 |
| 8,084,987 | B2 * | 12/2011 | Hurtz | 320/103 |
| 8,242,752 | B2 * | 8/2012 | Minkkinen | 320/165 |
| 8,648,573 | B2 * | 2/2014 | Lee et al. | 320/138 |

FOREIGN PATENT DOCUMENTS

JP 2007-60778 3/2007

* cited by examiner

*Primary Examiner* — Edward Tso
*Assistant Examiner* — Ramy Ramadan
(74) *Attorney, Agent, or Firm* — Robert F. Hightower

(57) ABSTRACT

A charger includes a power supply generating a direct current power supply potential, an output transistor, a USB connector, a controller, and a resistor bridge circuit. The controller has a potential setting circuit which sets the potentials of the first and second connection nodes of the resistor bridge circuit to a middle potential between a power supply potential and a ground potential in a first mode, and sets the potentials of the first and second connection nodes to the power supply potential in a second mode.

8 Claims, 5 Drawing Sheets

CHARGER FOR PORTABLE ELECTRONIC DEVICE

CROSS-REFERENCE OF THE INVENTION

This application claims priority from Japanese Patent Application No. 2011-052909, the content of which is incorporated herein by reference in its entirety.

BACKGROUND OF THE INVENTION

1. Field of the Invention

The invention relates to a charger which charges a rechargeable battery built in a portable electronic device such as a mobile phone through a USB interface.

2. Description of the Related Art

Recently, for realizing a smaller and lighter charger, there is used a charger which charges a rechargeable battery built in a portable electronic device by using a DC5V power supply supplied from a Vbus terminal which serves as a power supply terminal of a USB (Universal Serial Bus) which is widely used as a serial bus of a personal computer.

Japanese Patent Application publication No. 2007-60778 discloses a charger using a Vbus terminal of a USB, which realizes a high enough charging current without concern about an electric current value of a Vbus terminal used in other peripheral device connected to a USB interface.

Furthermore, for safety, a portable electronic device provided with a dedicated charger which is unchargeable without authentication is prevailing. Two types are known, i.e., devices made by Apple Computer, Inc. (iPod/iPhone/iPad) and smartphone type devices made by other manufacturers.

However, since the authentication method of the portable electronic devices made by Apple Computer, Inc. and the authentication method of the smartphone type portable electronic devices made by other manufacturers than Apple Computer, Inc. are different, it is necessary to provide a dedicated charger for each or a conversion adapter. This leads to cost increase for users and also causes inconvenience to users since users need keep a conversion adapter.

SUMMARY OF THE INVENTION

The invention provides a charger for a portable electronic device, including: a power supply generating a power supply potential; a power supply line and a ground line connected to the power supply; a USB connector connected to a portable electronic device through a USB cable comprising a Vbus terminal, a first data communication terminal, a second data communication terminal and a ground terminal; a switching element provided between the power supply line and the Vbus terminal; a resistor bridge circuit including a first resistor, a second resistor, a third resistor and a fourth resistor, a first connection node of the first resistor and the second resistor being connected to the first data communication terminal and a second connection node of the third resistor and the fourth resistor being connected to the second data communication terminal; and a controller including a switching control circuit controlling switching of the switching element and a potential setting circuit setting potentials of the first and second connection nodes to a middle potential between the power supply potential and a ground potential in a first mode and setting the potentials of the first and second connection nodes to the power supply potential in a second mode.

DETAILED DESCRIPTION OF THE INVENTION

Figure 1:
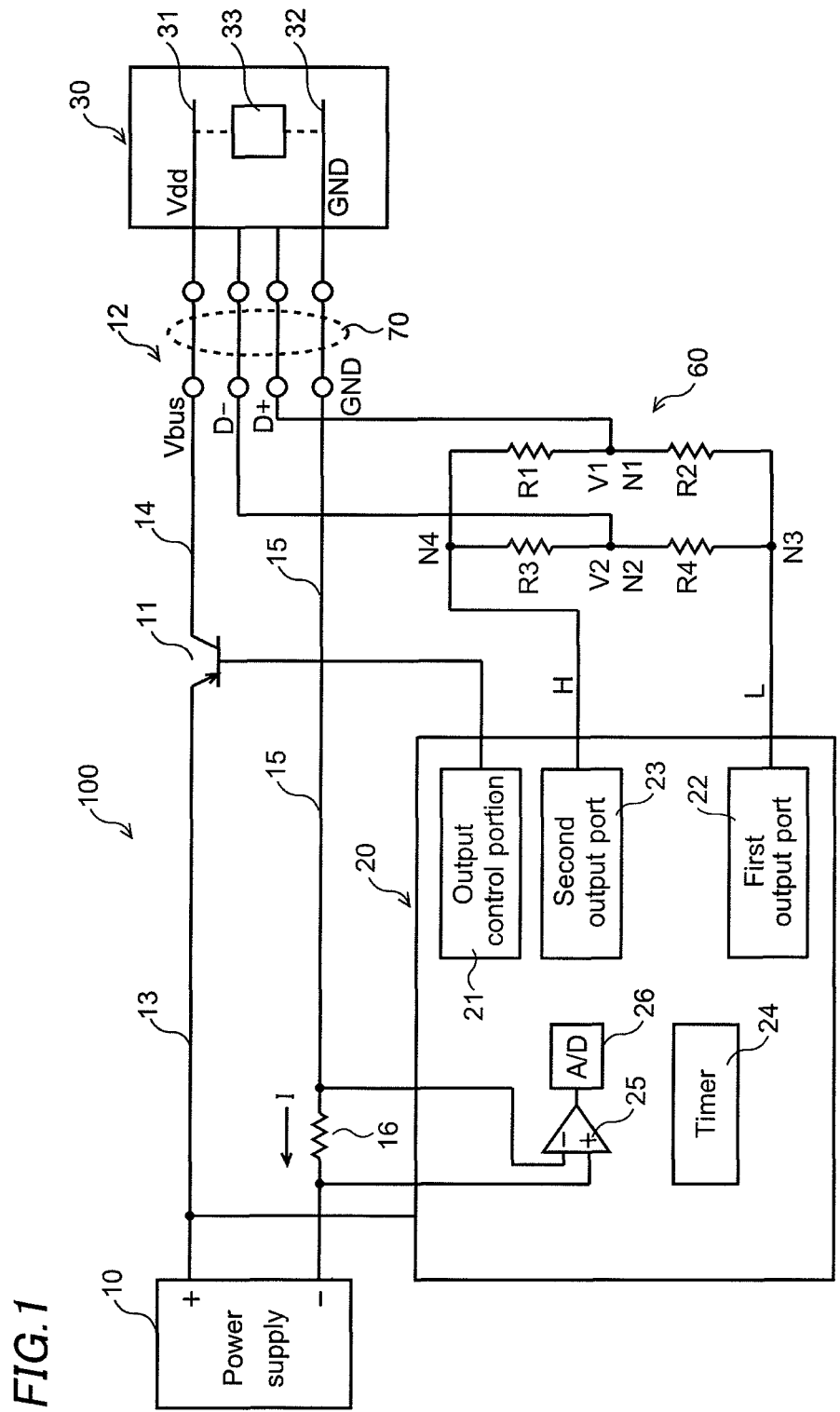
FIG. 1 is a circuit diagram of a charger for a portable electronic device (in a case of charging a portable electronic device made by Apple Computer, Inc.) of a first embodiment of the invention.
Figure 2:
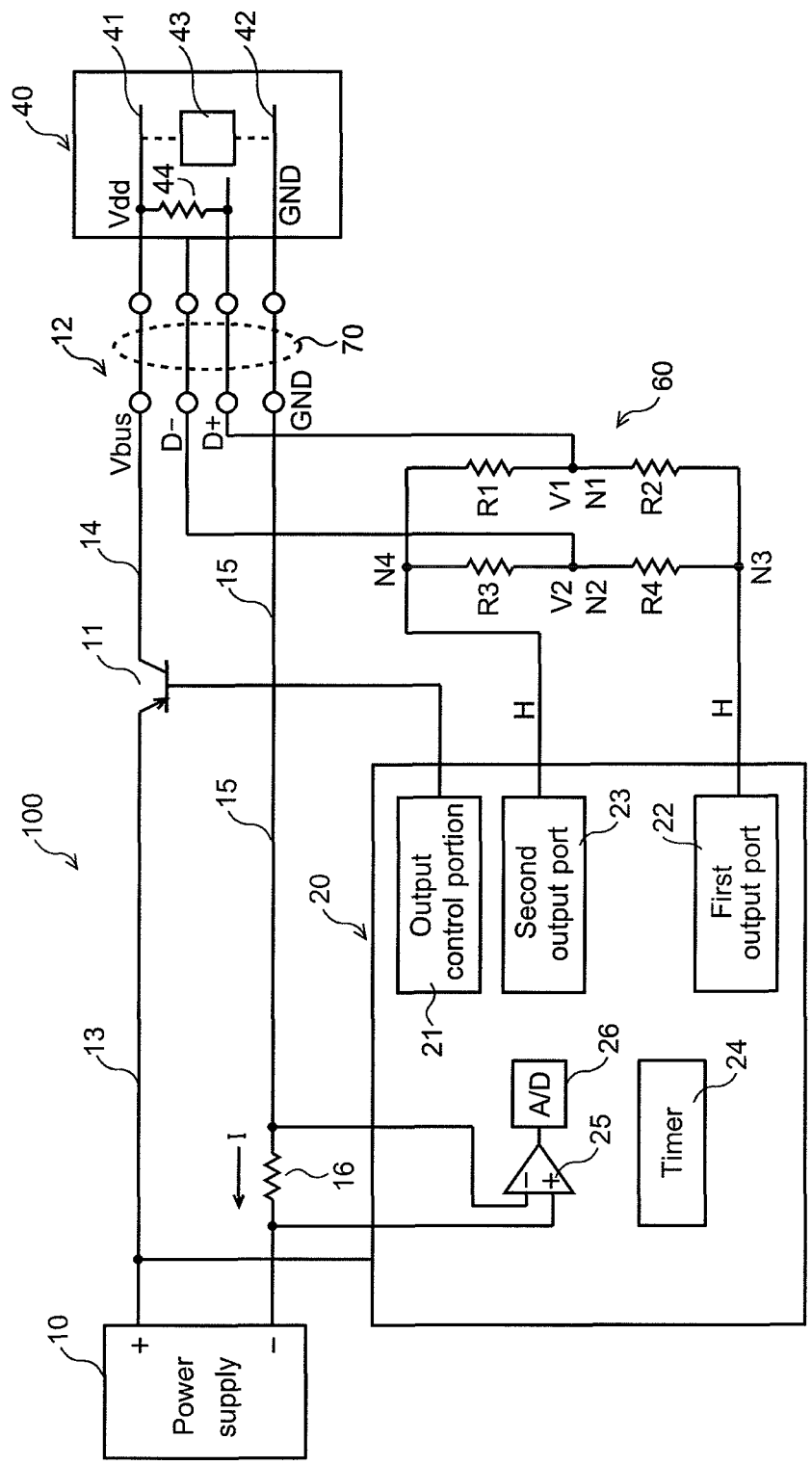
FIG. 2 is a circuit diagram of the charger for a portable electronic device (in a case of charging a smartphone type portable electronic device made by other manufacturers than Apple Computer, Inc.) of the first embodiment of the invention.
Figure 3:
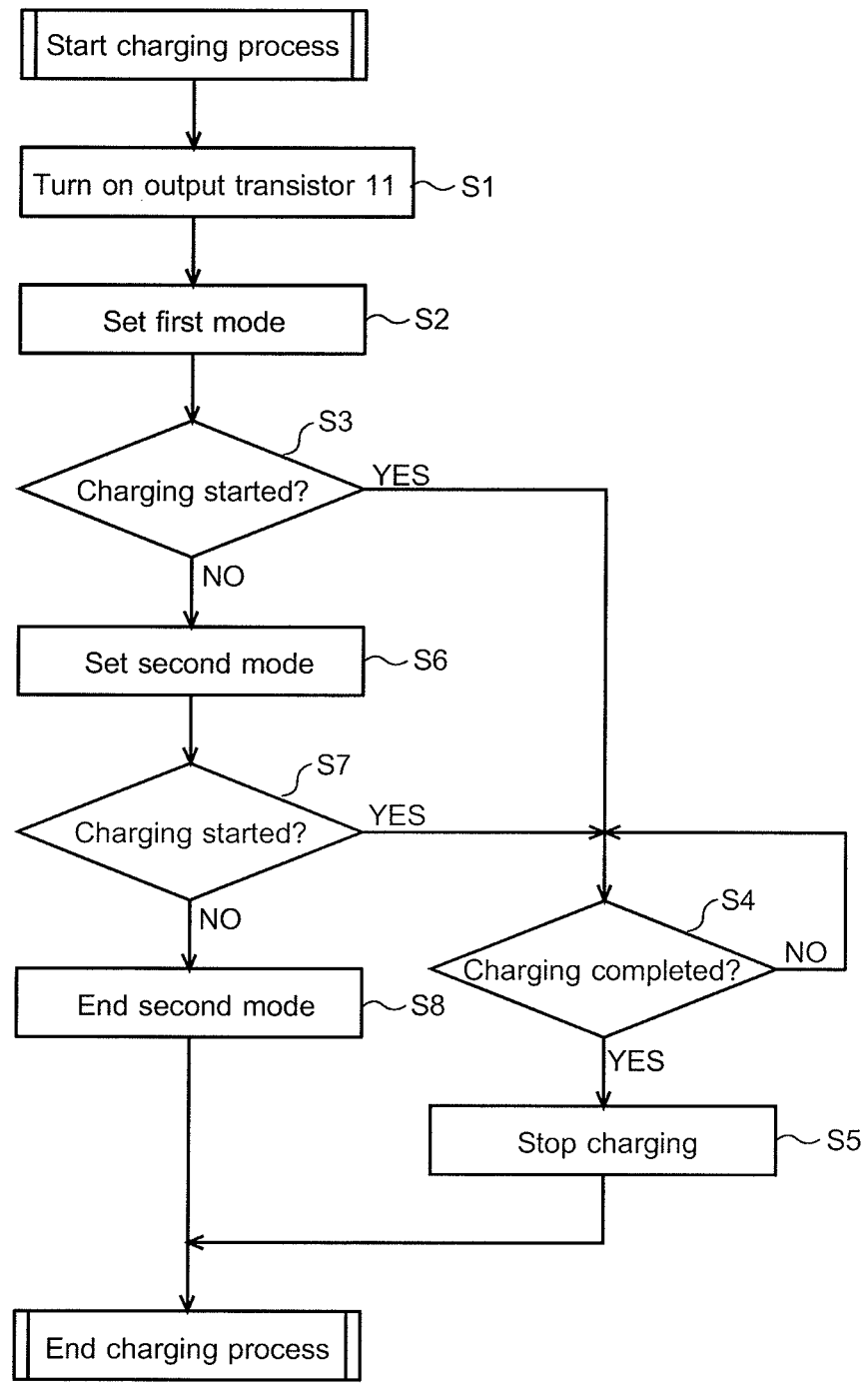
FIG. 3 is a flow chart for explaining the operation of the charger for a portable electronic device of the first embodiment of the invention.

Hereafter, a charger 100 for a portable electronic device (hereafter, referred to as a charger 100) of a first embodiment of the invention will be described referring to FIGS. 1 to 3. FIG. 1 shows a case in which a portable electronic device 30 made by Apple Computer, Inc. is connected to the charger 100. FIG. 2 shows a case in which a smartphone type portable electronic device 40 made by other manufacturer than Apple Computer, Inc. is connected to the charger 100. The charger 100 is configured so as to charge either of the portable electronic device 30 made by Apple Computer, Inc. and the smartphone type portable electronic device 40 made by other manufacturer than Apple Computer, Inc. by being connected thereto, as described below.

The charger 100 includes a power supply 10 generating a direct current power supply potential, an output transistor 11 (an example of a "switching element" of the invention), a USB connector 12, a controller 20, and a resistor bridge circuit 60. The power supply 10 is, for example, a secondary battery, such as a lithium-ion battery, which is chargeable by other charger which rectifies an AC100V power supply as a commercial alternating current power supply and converts it to a desired voltage by a DC/DC converter.

One end of a first power supply line 13 is connected to the plus terminal (+) of the power supply 10. The output transistor 11 is connected between the first power supply line 13 and a second power supply line 14. The output transistor 11 is a PNP type bipolar transistor, but it may be other type transistor.

The minus terminal (−) of the power supply 10 is connected to one end of a ground line 15. Another end of the ground line 15 is connected to the GND terminal (ground terminal) of the USB connector 12. A current detection resistor 16 detecting a charging current I flowing in the ground line 15 is provided in the ground line 15.

The USB connector 12 has four terminals, i.e., a Vbus terminal, a D+ terminal, a D− terminal and the GND terminal. The Vbus terminal (power supply terminal) and the GND terminal (ground terminal) are terminals relating to power supply, and the D+ terminal and the D− terminal are first and second data communication terminals, respectively.

The terminals of the USB connector 12 are respectively connectable to the corresponding terminals of the USB connector of the portable electronic device 30 made by Apple Computer, Inc. or the smartphone type portable electronic device 40 made by other manufacturer than Apple Computer, Inc. through a USB cable 70.

The emitter of the output transistor 11 is connected to another end of the first power supply line 13, and the collector of the output transistor 11 is connected to the Vbus terminal of the USB connector 12 through the second power supply line 14. A control signal from the output control portion 21 of the controller 20 is applied to the base of the output transistor 11.

The resistor bridge circuit 60 includes a first resistor R1, a second resistor R2, a third resistor R3 and a fourth resistor R4. The connection node of the first resistor R1 and the second resistor R2 (hereafter, referred to as a first connection node N1) is connected to the D+ terminal (first data communication terminal).

The connection node of the third resistor R3 and the fourth resistor R4 (hereafter, referred to as a second connection node N2) is connected to the D− terminal (second data communication terminal).

The structure of the controller 20 is as follows. The controller 20 includes the output control portion 21, a first output port 22, a second output port 23, a timer 24, a differential amplifier 25 and an A/D converter (analog/digital converter) 26. The power supply 10 is used as the operation power supply of the controller 20. In detail, a power supply potential from the plus terminal (+) of the power supply 10 and a ground potential from the minus terminal (−) are supplied to the controller 20.

The timer 24 is a circuit which outputs a timer signal when predetermined time passes. The output control portion 21 is a circuit which generates a control signal controlling the on and off of the output transistor 11.

The current detection resistor 16, the differential amplifier 25 and the A/D converter (analog/digital converter) 26 form a current detection circuit which detects a charging current I flowing in the ground line 15. A potential difference between both the ends of the current detection resistor 16 is amplified by the differential amplifier 25. The potential difference amplified by the differential amplifier 25 is converted to a digital signal by the A/D converter 26. By this, a charging current I flowing in the ground line 15 is detected.

The portable electronic device 30 or the portable electronic device 40 is connected to the charger 100, and a charging current I flows in the ground line 15 during the charging operation. A charging current I does not flow when the charging is completed or in the full charge state. Therefore, the controller 20 judges that the charging of the portable electronic device 30 or 40 is started or completed, based on a current detection result of the current detection circuit.

In a first mode (a mode for trying charging the portable electronic device 30 made by Apple Computer, Inc.), as shown in FIG. 1, the first output port 22 outputs a ground potential (L) to the connection node of the second resistor R2 and the fourth resistor R4 (hereafter, referred to as a third connection node N3), and the second output port 23 outputs a power supply potential (H) to the connection node of the first resistor R1 and the third resistor R3 (hereafter, referred to as a fourth connection node N4). Then, the potential V1 of the first connection node N1 and the potential V2 of the second connection node N2 in the resistor bridge circuit 60 are set to a predetermined middle potential between the power supply potential and the ground potential by resistance voltage division.

TABLE 1

|  | First mode | Second mode |
| --- | --- | --- |
| First output port | L | H |
| Second output port | H | H |

TABLE 1-continued

|  | First mode | Second mode |
| --- | --- | --- |
| D− terminal | Middle potential | Power supply potential |
| D+ terminal | Middle potential | Power supply potential |

By this, as shown in table 1, the D− terminal and D+ terminal of the USB connector 12 of the charger 100 are set to the middle potential. Then, when the portable electronic device 30 made by Apple Computer, Inc. is connected to the USB connector 12 of the charger 100 through the USB cable 70, the D− terminal and D+ terminal of the USB connector of the portable electronic device 30 made by Apple Computer, Inc. are also set to the middle potential. The portable electronic device 30 made by Apple Computer, Inc. recognizes itself as communicable when the D− terminal and D+ terminal of its own USB connector are set to the middle potential, based on the USB standard. The authentication of the charger 100 is thus performed and a rechargeable battery 33 turns to the chargeable state.

In detail, when the USB connector 12 of the charger 100 is connected to the portable electronic device 30 made by Apple Computer, Inc. through the USB cable 70, the Vbus terminal of the USB connector 12 is connected to the power supply line 31 of the portable electronic device 30, and the GND terminal of the USB connector 12 is connected to the ground line 32 of the portable electronic device 30. The rechargeable battery 33 is connected between the power supply line 31 and the ground line 32 of the portable electronic device 30 made by Apple Computer, Inc. through a switch (not shown). When the authentication of the charger 100 is successful as described above, the switch turns on to faint a path for charging the rechargeable battery 33. Then, the charging of the rechargeable battery 33 is started through the output transistor 11.

On the other hand, in a second mode (a mode for trying charging the smartphone type portable electronic device 40 made by other manufacturer than Apple Computer, Inc.), as shown in FIG. 2, the first output port 22 outputs a power supply potential (H) to the third connection node N3, and the second output port 23 outputs a power supply potential (H) to the fourth connection node N4. Then, both of the potential V1 of the first connection node N1 and the potential V2 of the second connection node N2 in the resistor bridge circuit 60 are set to the power supply potential. By this, as shown in table 1, both of the D− terminal and D+ terminal of the USB connector 12 of the charger 100 are set to the power supply potential.

In the smartphone type portable electronic device 40 made by other manufacturer than Apple Computer, Inc., a pull-up resistor 44 is provided between the power supply line 41 and the D+ terminal. By shortcircuiting of the D+ terminal and D− terminal of the charger 100, the H level (power supply potential) of the D+ terminal is sent to the D− terminal of the smartphone type portable electronic device 40 made by other manufacturer than Apple Computer, Inc., thereby performing the authentication of the charger 100. However, the same result is obtained by applying a power supply potential from an external circuit of the smartphone type portable electronic device 40 made by other manufacturer than Apple Computer, Inc. to the D− terminal, thereby also achieving the authentication of the charger.

Therefore, in the charger 100, the authentication of the charger 100 is realized by setting the D− terminal and D+ terminal to the same power supply potential (e.g. +5 V). In detail, when the USB connector 12 of the charger 100 is connected to the smartphone type portable electronic device 40 made by other manufacturer than Apple Computer, Inc. through the USB cable 70, the Vbus terminal of the USB connector 12 is connected to the power supply line 41 of the smartphone type portable electronic device 40 made by other manufacturer than Apple Computer, Inc., and the GND terminal of the USB connector 12 is connected to the ground line 42 of the smartphone type portable electronic device 40 made by other manufacturer than Apple Computer, Inc. A rechargeable battery 43 is connected between the power supply line 41 and the ground line 42 of the smartphone type portable electronic device 40 made by other manufacturer than Apple Computer, Inc. through a switch (not shown). As described above, when the authentication of the charger 100 is successful, the switch turns on to form a path for charging the rechargeable battery 43. Then, the charging of the rechargeable battery 43 is started through the output transistor 11.

It is noted that the controller 20 may include a microcomputer. In this case, outputs of the first output port 22 and the second output port 23 are controllable by a program stored in the ROM of the microcomputer.

Next, the operation of the charger 100 will be described referring to a flow chart in FIG. 3. The operation described below is performed by executing a program stored in a ROM built in the controller 20 by a CPU built in the controller 20.

First, a portable electronic device to be charged is connected to the charger 100 through the USB cable 70. In first Step S1, the controller 20 turns on the output transistor 11. Then, in Step S2, the charger 100 is set to the first mode (the mode for trying charging the portable electronic device 30 made by Apple Computer, Inc.). In this case, when the portable electronic device connected to the charger 100 is the portable electronic device 30 made by Apple Computer, Inc., the D– terminal and D+ terminal described above are set to the middle potential and thus the authentication of the charger 100 is successful, thereby starting charging the portable electronic device. If the portable electronic device connected to the charger 100 is other one than the portable electronic device 30 made by Apple Computer, Inc., the authentication is failed and the charging is not started.

In Step S3, the controller 20 judges whether or not the charging of the portable electronic device is started, based on a current detection result of the current detection circuit. For example, the controller 20 judges that the charging is started when a predetermined value of current or more is detected for predetermined time or more. The predetermined time is detected by the timer 24.

When it is judged that the charging of the portable electronic device is started, in Step S4, the controller 20 judges whether or not the charging is completed, based on a current detection result of the current detection circuit. For example, the controller 20 judges that the charging is completed when zero current is detected. When it is judged that the charging is completed, in Step S5, the controller 20 turns off the output transistor 11 to stop the charging operation.

On the other hand, in Step S3, when it is judged that the charging of the portable electronic device is not started, the first mode is ended. Then, after predetermined time, in Step S6, the charger 100 is set to the second mode (the mode for trying charging the smartphone type portable electronic device 40 made by other manufacturer than Apple Computer, Inc.). In this case, when the portable electronic device connected to the charger 100 is the smartphone type portable electronic device 40 made by other manufacturer than Apple Computer, Inc., the D– terminal and D+ terminal are set to the power supply potential as described above and the authentication of the charger 100 is successful, thereby starting charging the portable electronic device. If the portable electronic device connected to the charger 100 is other one than the smartphone type portable electronic device 40 made by other manufacturer than Apple Computer, Inc., the authentication is failed and the charging is not started.

When it is judged that the charging of the portable electronic device is started, in Step S4, the controller 20 judges whether or not the charging is completed, based on a current detection result of the current detection circuit. For example, the controller 20 judges that the charging is completed when zero current is detected. When it is judged that the charging is completed, in Step S5, the controller 20 turns off the output transistor 11 to stop the charging operation.

On the other hand, when it is judged that the charging of the portable electronic device is not started in Step S7, the second mode is ended in Step S8.

As described above, the charger 100 is set to the first mode to try charging, and if the charging is not started, the charger 100 is switched to the second mode to try charging. If the charging is not started in either of the modes, the portable electronic device is a non-compliant device or the charging is already completed. Therefore, the charging process is ended. One charger 100 is thus applicable to charging either of the portable electronic device 30 made by Apple Computer, Inc. and the smartphone type portable electronic device 40 made by other manufacturer than Apple Computer, Inc., thereby enhancing convenience for users. Furthermore, basically, the charger 100 is made by forming the resistor bridge circuit 60 in a conventional charger, thereby minimizing the cost. It is noted that the order of the first and second modes may be reversed.

Figure 4:
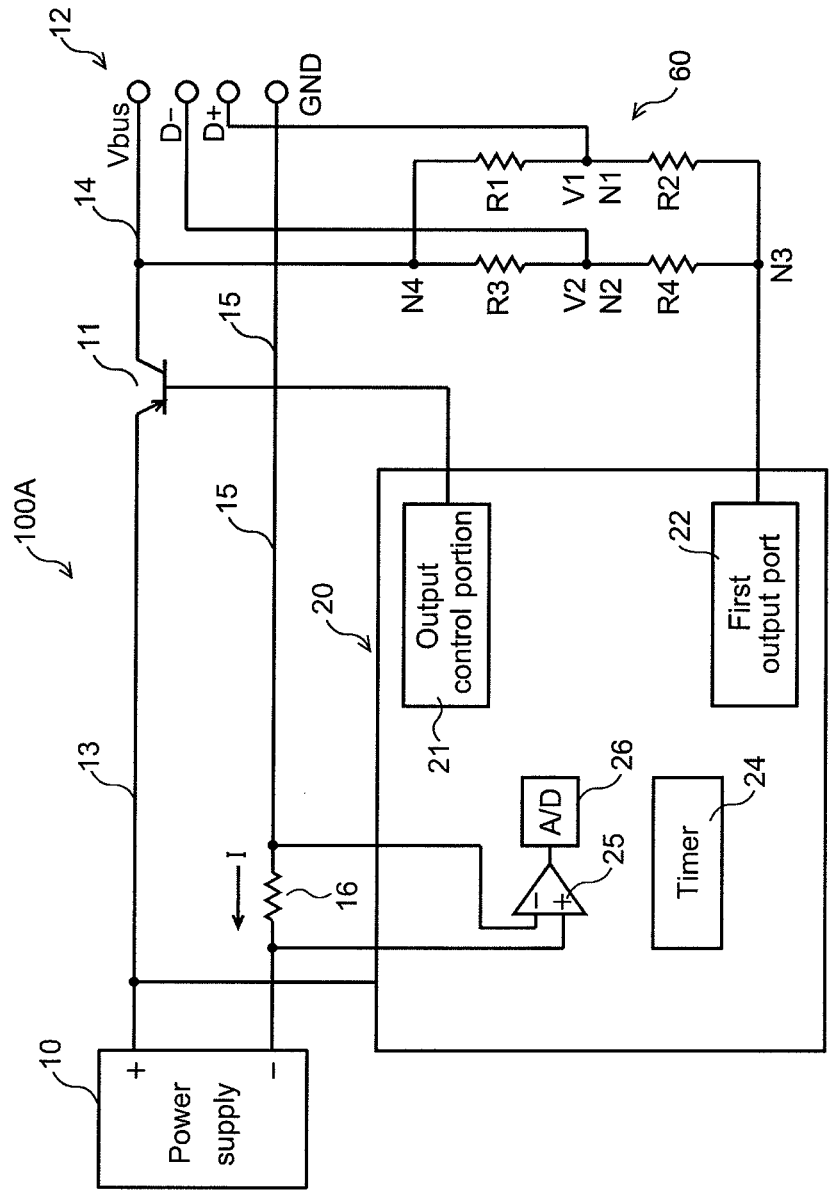
FIG. 4 is a circuit diagram of a charger for a portable electronic device of a second embodiment of the invention.

Next, a charger 100A of a second embodiment will be described referring to FIG. 4. This charger 100A differs from the charger 100 of the first embodiment in that the fourth connection node N4 of the resistor bridge circuit 60 is connected to the second power supply line 14 and the second output port 23 is not necessary.

In the first mode (the mode for trying charging the portable electronic device 30 made by Apple Computer, Inc.), the first output port 22 outputs a ground potential (L) to the third connection node N3. Then the potential V1 of the first connection node N1 and the potential V2 of the second connection node N2 in the resistor bridge circuit 60 are set to a predetermined middle potential between the power supply potential and the ground potential by resistance voltage division. By this, as shown in table 2, the D– terminal and D+ terminal of the USB connector 12 of the charger 100A are set to the middle potential, and the same result as in the charger 100 of the first embodiment is obtained.

On the other hand, in the second mode (the mode for trying charging the smartphone type portable electronic device 40 made by other manufacturer than Apple Computer, Inc.), the first output port 22 outputs a power supply potential (H) to the third connection node N3. Then both of the potential V1 of the first connection node N1 and the potential V2 of the second connection node N2 in the resistor bridge circuit 60 are set to the power supply potential. By this, as shown in table 2, the D– terminal and D+ terminal of the USB connector 12 of the charger 100A are set to the same power supply potential (e.g. +5 V), and the same result as in the charger 100 of the first embodiment is obtained.

TABLE 2

|  | First mode | Second mode |
| --- | --- | --- |
| First output port | L | H |
| D– terminal | Middle potential | Power supply potential |
| D+ terminal | Middle potential | Power supply potential |

Figure 5:
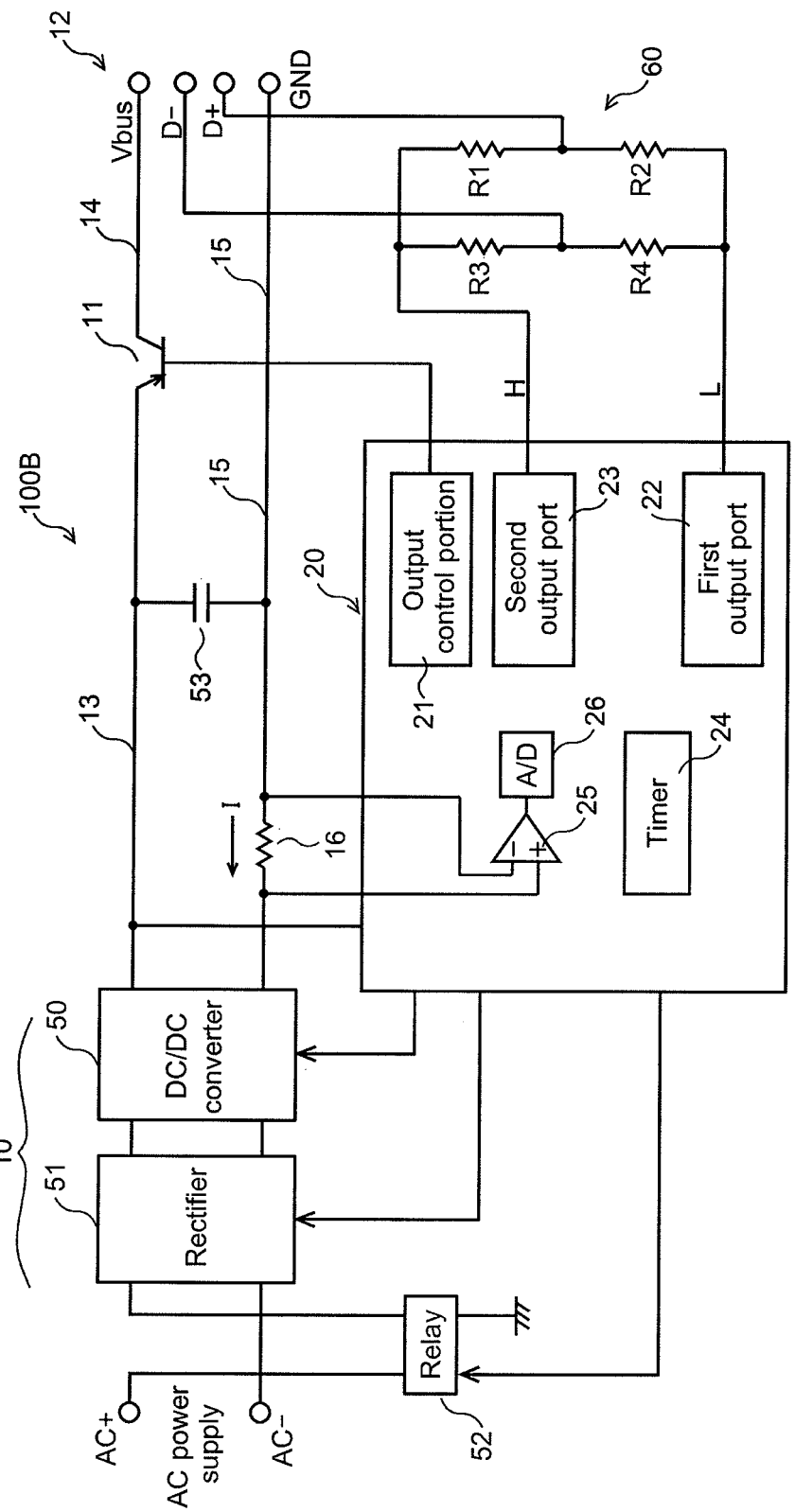
FIG. 5 is a circuit diagram of a charger for a portable electronic device of a third embodiment of the invention.

Next, a charger 100B of a third embodiment will be described referring to FIG. 5. The charger 100B of the third embodiment is made by forming the power supply 10 of the charger 100 of the first embodiment with a DC/DC converter 50, a rectifier 51 and a relay 52 and by adding a backup capacitor 53 so as to control the operation of the DC/DC converter 50, the rectifier 51 and the relay 52 by the controller 20.

The DC/DC converter 50, the rectifier 51 and the relay 52 form the power supply 10 for charging, and the backup capacitor 53 forms a power supply for the controller 20.

The relay 52 is a circuit which switches the on and off of the AC100V power supply as a commercial alternating current power supply. When the relay 52 turns on, an AC100V power supply voltage inputted through the AC+ terminal and AC− terminal (AC plug terminals) is supplied to the rectifier 51.

The rectifier 51 rectifies the AC100V supply voltage supplied through the relay 52. The DC/DC converter 50 is a circuit which smoothes an output voltage of the rectifier 51 and converts it to a predetermined DC voltage. The backup capacitor 53 is charged by an output of the DC/DC converter 50, and used as the power supply of the controller 20 in the standby state when a portable electronic device is not charged.

In detail, in the standby state, the controller 20 is operated by the voltage of the backup capacitor 53. Only when the voltage of the backup capacitor 53 decreases, the controller 20 turns on the relay 52 and operates the rectifier 51 and the DC/DC converter 50 so as to charge the backup capacitor 53. This achieves reduction in power consumption of the charger 100B in the standby state.

In particular, when the relay 52 is in the off state, the controller 20 uses the backup capacitor 53 as the operation power supply potential, and the DC/DC converter 50 and the rectifier 51 stop operating. This makes the standby power consumption of the charger 100B substantially zero.

Then, when it is judged that a portable electronic device is connected to the USB connector 12, the output transistor 11 is set to the on state and the relay 52 is set to the on state by the controller 20, and the DC/DC converter 50 starts operating. Thus, an output of the DC/DC converter 50 is outputted to the Vbus terminal of the USB connector.

In the invention, one charger is applicable to charging two kinds of devices, i.e., a portable electronic device made by Apple Computer, Inc. and a smartphone type portable electronic device made by other manufacturer than Apple Computer, Inc. which have different authentication methods. The invention also enhances convenience for users since charging is realized by using a data communication cable (USB cable) without a dedicated charging cable.

What is claimed is:

1. A charger for a portable electronic device, comprising:
a power supply generating a power supply potential;
a power supply line and a ground line that are connected to the power supply;
a USB connector configured to be connected to a portable electronic device through a USB cable, the USB connector comprising a Vbus terminal, a first data communication terminal, a second data communication terminal and a ground terminal;
a switching element provided between the power supply line and the Vbus terminal;
a resistor bridge circuit comprising a first resistor, a second resistor, a third resistor and a fourth resistor, a first connection node of the first resistor and the second resistor being connected to the first data communication terminal and a second connection node of the third resistor and the fourth resistor being connected to the second data communication terminal; and
a controller comprising a switching control circuit controlling switching of the switching element and a potential setting circuit setting potentials of the first and second connection nodes to a middle potential between the power supply potential and a ground potential in a first mode and setting the potentials of the first and second connection nodes to the power supply potential in a second mode.

2. The charger for the portable electronic device of claim 1, wherein the potential setting circuit comprises a first output port which applies a ground potential to a third connection node of the second resistor and the fourth resistor in the first mode and applies a power supply potential to the third connection node in the second mode and a second output port which applies a power supply potential to a fourth connection node of the first resistor and the third resistor in the first mode and the second mode.

3. The charger for the portable electronic device of claim 1, wherein the potential setting circuit comprises an output port which applies a ground potential to a third connection node of the second resistor and the fourth resistor in the first mode and applies a power supply potential to the third connection node in the second mode, and a fourth connection node of the first resistor and the third resistor is connected to the Vbus terminal.

4. The charger for the portable electronic device of claim 1, further comprising a current detection circuit detecting a current flowing in the ground line, wherein the controller determines charge start or charge completion of the portable electronic device based on a current detection result of the current detection circuit.

5. The charger for the portable electronic device of claim 1, wherein the controller turns on the switching element and performs the first mode potential setting, and when the controller determines that the charging of the portable electronic device connected to the USB connector is not started, the controller performs the second mode potential setting.

6. The charger for the portable electronic device of claim 1, wherein the controller turns on the switching element and performs the second mode potential setting, and when the controller determines that the charging of the portable electronic device connected to the USB connector is not started, the controller performs the first mode potential setting.

7. The charger for the portable electronic device of claim 1, wherein the power supply comprises an AC plug terminal, a relay, a rectifier rectifying an AC voltage supplied through the AC plug terminal and the relay, a DC/DC converter converting an output voltage of the rectifier to a predetermined DC voltage, and a backup capacitor connected between the power supply line and the ground line connected to the DC/DC converter and supplying a power supply to the controller, and the controller turns on the relay and operates the rectifier and the DC/DC converter so as to charge the backup capacitor when a potential of the power supply line becomes smaller than a predetermined value in a standby state.

8. The charger for the portable electronic device of claim 7, wherein the controller turns on the relay and operates the rectifier and the DC/DC converter when the portable electronic device is charged.

* * * * *